United States Patent
Guo (10) Patent No.: US 11,394,656 B2
(45) Date of Patent: Jul. 19, 2022

(54) METHOD AND APPARATUS FOR AVOIDING PACKET FRAGMENTATION

(71) Applicant: HUAWEI TECHNOLOGIES CO., LTD., Shenzhen (CN)

(72) Inventor: Chengxu Guo, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/134,077

(22) Filed: Dec. 24, 2020

(65) Prior Publication Data

US 2021/0119931 A1 Apr. 22, 2021

Related U.S. Application Data

(63) Continuation of application No. PCT/CN2019/092029, filed on Jun. 20, 2019.

(30) Foreign Application Priority Data

Jun. 25, 2018 (CN) .......................... 201810659649.2

(51) Int. Cl.
*H04L 12/28* (2006.01)
*H04L 47/36* (2022.01)
(Continued)

(52) U.S. Cl.
CPC ........ *H04L 47/365* (2013.01); *H04L 12/4633* (2013.01); *H04L 45/74* (2013.01); *H04W 28/065* (2013.01)

(58) Field of Classification Search
None
See application file for complete search history.

(56) References Cited

U.S. PATENT DOCUMENTS 8,547,979 B2 * 10/2013 Gu .......................... H04L 45/74
370/394
9,641,435 B1 * 5/2017 Sivaramakrishnan ......................
H04L 69/166
(Continued)

FOREIGN PATENT DOCUMENTS

CN 102036304 A 4/2011
CN 103262606 A 8/2013
(Continued)

OTHER PUBLICATIONS

J. McCann et al.,"Path MTU Discovery for IP version 6", Internet Engineering Task Force (IETF); Request for Comments: 8201, Jul. 2017, total 19 pages.
(Continued)

*Primary Examiner* — Gerald A Smarth (57) ABSTRACT

This application provides a method and an apparatus for avoiding packet fragmentation. In the embodiments of this application, when receiving a first service packet sent by a first device, a second device first determines whether a length of the first service packet is greater than that of a first MTU maintained by the second device, where the first MTU is determined based on both a second MTU of an IP link and a packet header encapsulated based on a GTPU tunnel; and when the first service packet is greater than the first MTU size, the first MTU size is sent to the first device. Based on this, in the embodiments of this application, the second device may be prevented from fragmenting a service packet, and the third device may be prevented from reassembling the service packet, thereby improving data transmission efficiency of a GTPU tunnel.

21 Claims, 4 Drawing Sheets

(51) Int. Cl.
*H04L 12/46* (2006.01)
*H04L 45/74* (2022.01)
*H04W 28/06* (2009.01)

(56) References Cited

U.S. PATENT DOCUMENTS

| | | | | |
|---|---|---|---|---|
| 2011/0103399 | A1* | 5/2011 | Bransi | H04L 12/4633 370/470 |
| 2013/0279464 | A1* | 10/2013 | Gu | H04W 28/06 370/329 |
| 2014/0016545 | A1 | 1/2014 | Jaiswal et al. | |
| 2015/0023146 | A1* | 1/2015 | Suzuki | H04L 45/28 370/216 |
| 2017/0093736 | A1* | 3/2017 | Tsirkin | H04L 67/2842 |
| 2017/0353935 | A1 | 12/2017 | Xiang et al. | |

FOREIGN PATENT DOCUMENTS

| | | |
|---|---|---|
| CN | 104618275 A | 5/2015 |
| CN | 105099937 A | 11/2015 |
| CN | 106612245 A | 5/2017 |
| CN | 106713187 A | 5/2017 |
| CN | 107071826 A | 8/2017 |
| CN | 107493221 A | 12/2017 |

OTHER PUBLICATIONS

International Search Report and Written Opinion issued in PCT/CN2019/092029, dated Sep. 10, 2019, total 10 pages.
Office Action issued in CN Application No. 2018106596492, dated Mar. 15, 2021, total 7 pages.
3GPP Draft; TR_R3018_V_090,:"3rd Generation Partnership Project; Technical Specification Group Radio Access Network; Evolved UTRA and UTRAN; Radio Access Architecture and Interfaces (Release 7)", May 16, 2007, XP050423658, total 140 pages.
Mogul Decwrl S. Deering Stanford University: "Path MTU Discovery; rfc1191.txt", Nov. 1, 1990, XP015006135, total 20 pages.
Mccann Digital Equipment Corporation S. Deering Xerox Parc J. Mogul Digital Equipment Corporation: "Path MTU Discovery for IP version 6; rfc1981.txt", Aug. 1, 1996, XP015007765, total 16 pages.
Savola CSC/FUNET P: "MTU and Fragmentation Issues with In-the-Network Tunneling; rfc4459.txt", Apr. 1, 2006, XP015046335, total 14 pages.
Extended European Search Report issued in EP 19826936.7, dated Jul. 9, 2021, total 10 pages.
J. McCann et al., Path MTU Discovery for IP version 6. RFC1981, Aug. 1996, 15 pages.
Notice of Allowance issued in CN201810659649.2, dated Mar. 3, 2022, 4 pages.

* cited by examiner

METHOD AND APPARATUS FOR AVOIDING PACKET FRAGMENTATION

CROSS-REFERENCE TO RELATED APPLICATIONS

This application is a continuation of International Application No. PCT/CN2019/092029, filed on Jun. 20, 2019, which claims priority to Chinese Patent Application No. 201810659649.2, filed on Jun. 25, 2018. The disclosures of the aforementioned applications are hereby incorporated by reference in their entireties.

TECHNICAL FIELD

This application relates to the communications field, and more specifically, to a method and an apparatus for avoiding packet fragmentation.

BACKGROUND

A general packet radio service (general packet radio service, GPRS) is a wireless packet switching technology based on the global system for mobile communications (global system for mobile communications, GSM). It provides end-to-end and wide-area wireless IP connections, uses a packet-encapsulated data transmission mode, and has advantages such as a high data transmission speed. A GPRS tunneling protocol for the user plane (GPRS tunneling protocol for the user plane, GTPU) is an IP-based communication protocol used to support GPRS services. The GTPU is applied to a core network to implement user data transmitting between a radio access network and the core network.

In a process of transmitting an IP service packet on a GTPU tunnel, a packet header needs to be encapsulated for the IP service packet according to the GTPU. This increases extra system overheads. When the length of a packet encapsulated with a packet header and transmitted on the GTPU tunnel exceeds that of a maximum transmission unit (maximum transmission unit, MTU) of an IP backhaul (backhaul) link, the packet encapsulated with the packet header has to be fragmented in an access network, and then packet reassembly is performed in a core network. However, packet fragmentation and reassembly may consume a lot of computing and memory resources, thereby reducing a data transmission efficiency of the GTPU tunnel.

Therefore, how to avoid packet fragmentation in a process of transmitting a service packet on a GTPU tunnel is a problem that urgently needs to be resolved.

SUMMARY

This application provides a method and an apparatus for avoiding packet fragmentation based on a GTPU tunnel, to avoid the packet fragmentation in a process of transmitting a service packet on the GTPU tunnel.

According to a first aspect, a method for avoiding packet fragmentation based on a GTPU tunnel is provided, including:

A second device obtains a first service packet sent by a first device;

the second device sends a first message to the first device when the second device determines that a length of the first service packet is greater than that of a first maximum transmission unit MTU, where the first message includes the first MTU, and the first MTU is determined based on a second MTU of an IP link and a packet header encapsulated by the second device based on the GTPU tunnel; and the second device receives at least two second service packets sent by the first device, where the at least two second service packets are determined by the first device based on the first service packet, and a length of each of the at least two second service packets is less than or equal to that of the first MTU.

When obtaining the at least two second service packets, the second device separately encapsulates the at least two second service packets based on a GTPU tunnel protocol, and sends the at least two encapsulated second service packets to a third device through a GTPU tunnel between the second device and the third device. Because the length of each second service packet is less than or equal to that of the first MTU, a total length of the second service packets that have been encapsulated based on the GTPU tunnel protocol is less than or equal to that of an MTU of the GTPU tunnel. Therefore, the second device may be prevented from fragmenting the first service packet.

Therefore, in this embodiment of this application, when receiving the first service packet sent by the first device, the second device first determines whether the length of the first service packet is greater than that of the first MTU maintained by the second device, where the first MTU is determined based on both a second MTU of an IP link and a packet header encapsulated based on a GTPU tunnel; and when the first service packet is greater than the first MTU size, the first MTU size is sent to the first device, so that the first device divides the first service packet into at least two second service packets based on the first MTU, and the length of each of the at least two second service packets is less than or equal to that of the first MTU. Based on this, in this embodiment of this application, the second device may be prevented from fragmenting the service packet, and the third device may be prevented from reassembling the service packet, thereby improving data transmission efficiency of the GTPU tunnel.

In this embodiment of this application, the first MTU may be determined based on the second MTU of the IP link and the packet header encapsulated by the second device based on the GTPU tunnel. Herein, the encapsulated packet header is used to enable an original IP packet to be transmitted on the GTPU tunnel, and an IP packet encapsulated based on the GTPU tunnel is transmitted on an IP backhaul link, that is, when a length of the packet encapsulated based on the GTPU tunnel is less than or equal to that of the second MTU of the IP backhaul link, the original IP packet may be enabled to be transmitted on the GTPU tunnel, and the IP packet encapsulated based on the GTPU tunnel may be enabled to be transmitted on the IP backhaul link.

With reference to the first aspect, in some possible implementations of the first aspect, the first MTU meets the following formula:

MTU1≤MTU2−$L1$, where

MTU1 indicates the length of the first MTU, MTU2 indicates a length of the second MTU of the IP link, and $L1$ indicates a length of the packet header encapsulated by the second device based on the GTPU tunnel.

With reference to the first aspect, in some possible implementations of the first aspect, the first MTU meets the following formula:

MTU1≤MTU2−$L1$−$L2$, where

MTU1 indicates the length of the first MTU, MTU2 indicates a length of the second MTU of the IP link, $L1$ indicates a length of the packet header encapsulated by the second device based on the GTPU tunnel, and L2 indicates a length of an IPSEC header.

With reference to the first aspect, in some possible implementations of the first aspect, the packet header encapsulated by the second device based on the GTPU tunnel is a GTPU/UDP/IP header.

With reference to the first aspect, in some possible implementations of the first aspect, the second MTU is a smallest MTU in a network path of the IP link.

In some possible implementations, when a PMTU scenario is not supported, the second MTU is an MTU of a transmit end device of the GTPU tunnel or an MTU of a node in the GTPU tunnel.

In this embodiment of this application, the IP header and the IPSEC header in the GTPU header have overheads of different lengths in an IPv6 scenario and an IPv4 scenario. For example, in the IPv6 scenario, a length of a basic IP header is 40 bytes. In the IPv4 scenario, the length of the basic IP header is 20 bytes.

According to a second aspect, a method for avoiding packet fragmentation based on a GTPU tunnel is provided, including:

A first device sends a first service packet to a second device;

the first device receives a first message sent by the second device, where the first message includes a first MTU, a length of the first service packet is greater than that of the first MTU, and the first MTU is determined by the second device based on a second MTU of an IP backhaul link and a packet header encapsulated by the second device based on the GTPU tunnel; the first device divides the first service packet into at least two second service packets based on the first MTU, where a length of each of the at least two second service packets is less than or equal to that of the first MTU; and the first device sends the at least one second service packets to the second device.

When obtaining the at least two second service packets, the second device separately encapsulates the at least two second service packets based on the GTPU tunnel protocol, and sends the at least two encapsulated second service packets to a third device through a GTPU tunnel between the second device and the third device. Because the length of each second service packet is less than or equal to that of the first MTU, a total length of the second service packets that have been encapsulated based on the GTPU tunnel protocol is less than or equal to that of an MTU of the GTPU tunnel. Therefore, the second device may be prevented from fragmenting the first service packet.

Therefore, in this embodiment of this application, when receiving the first service packet sent by the first device, the second device first determines whether the length of the first service packet is greater than that of the first MTU maintained by the second device, where the first MTU is determined based on both a second MTU of an IP link and a packet header encapsulated based on a GTPU tunnel; and when the first service packet is greater than the first MTU size, the first MTU size is sent to the first device, so that the first device divides the first service packet into at least two second service packets based on the first MTU, and the length of each of the at least two second service packets is less than or equal to that of the first MTU. Based on this, in this embodiment of this application, the second device may be prevented from fragmenting the service packet, and the third device may be prevented from reassembling the service packet, thereby improving data transmission efficiency of the GTPU tunnel.

In this embodiment of this application, the first MTU may be determined based on the second MTU of the IP link and the packet header encapsulated by the second device based on the GTPU tunnel. Herein, the encapsulated packet header is used to enable an original IP packet to be transmitted on the GTPU tunnel, and an IP packet encapsulated based on the GTPU tunnel is transmitted on an IP backhaul link, that is, when the length of the packet encapsulated based on the GTPU tunnel is less than or equal to that of the second MTU of the IP backhaul link, the original IP packet may be enabled to be transmitted on the GTPU tunnel, and the IP packet encapsulated based on the GTPU tunnel may be enabled to be transmitted on the IP backhaul link.

With reference to the second aspect, in some possible implementations of the second aspect, the first MTU meets the following formula:

$$MTU1 \le MTU2-L1, \text{where}$$

MTU1 indicates the length of the first MTU, MTU2 indicates a length of the second MTU of the IP link, and L1 indicates a length of the packet header encapsulated by the second device based on the GTPU tunnel.

With reference to the second aspect, in some possible implementations of the second aspect, the first MTU meets the following formula:

$$MTU1 \le MTU2-L1-L2, \text{where}$$

MTU1 indicates the length of the first MTU, MTU2 indicates a length of the second MTU of the IP link, L1 indicates a length of the packet header encapsulated by the second device based on the GTPU tunnel, and L2 indicates a length of an IPSEC header.

With reference to the second aspect, in some possible implementations of the second aspect, the packet header encapsulated by the second device based on the GTPU tunnel is a GTPU/UDP/IP header.

With reference to the second aspect, in some possible implementations of the second aspect, the second MTU is a smallest MTU in a network path of the IP link.

In some possible implementations, when a PMTU scenario is not supported, the second MTU is an MTU of a transmit end device of the GTPU tunnel or an MTU of a node in the GTPU tunnel.

In this embodiment of this application, the IP header and the IPSEC header in the GTPU header have overheads of different lengths in an IPv6 scenario and an IPv4 scenario. For example, in the IPv6 scenario, a length of a basic IP header is 40 bytes. In the IPv4 scenario, the length of the basic IP header is 20 bytes.

According to a third aspect, an apparatus for avoiding packet fragmentation is provided. The apparatus is configured to perform the method in the first aspect or any possible implementation of the first aspect. Specifically, the apparatus may include a module configured to perform the method in the first aspect or any possible implementation of the first aspect.

According to a fourth aspect, an apparatus for avoiding packet fragmentation is provided. The apparatus is configured to perform the method in the second aspect or any possible implementation of the second aspect. Specifically, the apparatus may include a module configured to perform the method in the second aspect or any possible implementation of the second aspect.

According to a fifth aspect, an apparatus for avoiding packet fragmentation is provided. The apparatus includes a memory and a processor. The memory is configured to store an instruction, the processor is configured to execute the instruction stored in the memory, and execution of the instruction stored in the memory enables the processor to perform the method in the first aspect or any possible implementation of the first aspect.

According to a sixth aspect, an apparatus for avoiding packet fragmentation is provided. The apparatus includes a memory and a processor. The memory is configured to store an instruction, the processor is configured to execute the instruction stored in the memory, and execution of the instruction stored in the memory enables the processor to perform the method in the second aspect or any possible implementation of the second aspect.

According to a seventh aspect, a computer-readable storage medium is provided. The computer readable storage medium stores an instruction. When the instruction is run on a computer, the computer is enabled to perform the method in the first aspect or any possible implementation of the first aspect.

According to an eighth aspect, a computer-readable storage medium is provided. The computer readable storage medium stores an instruction. When the instruction is run on a computer, the computer is enabled to perform the method in the second aspect or any possible implementation of the second aspect.

According to a ninth aspect, a computer program product including an instruction is provided. When the computer program product is run on a computer, the computer is enabled to perform the method in the first aspect or any possible implementation of the first aspect.

According to a tenth aspect, a computer program product including an instruction is provided. When the computer program product is run on a computer, the computer is enabled to perform the method in the second aspect or any possible implementation of the second aspect.

DESCRIPTION OF EMBODIMENTS

The following describes technical solutions of this application with reference to accompanying drawings.

The technical solutions of the embodiments of this application may be applied to various communications systems, such as: a global system for mobile communication (global system of mobile communication, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD), a universal mobile telecommunications system (universal mobile telecommunications system, UMTS), a worldwide interoperability for microwave access (worldwide interoperability for microwave access, WiMAX) communication system, a future 5th generation (5th generation, 5G) system, or a new radio (new radio, NR) system.

Figure 1:
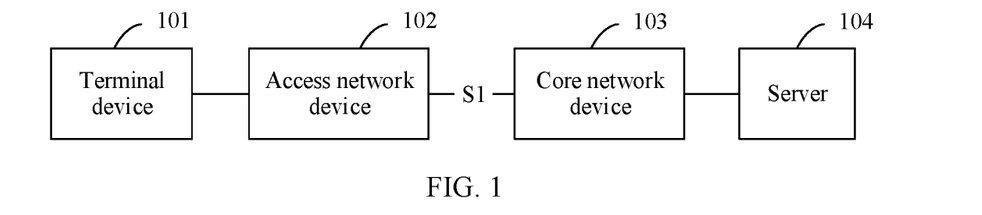
FIG. 1 is a schematic diagram of a system architecture to which an embodiment of this application is applied.

FIG. 1 is a schematic diagram of a system architecture to which an embodiment of this application is applied. As shown in FIG. 1, the system architecture includes a terminal device 101, an access network device 102, a core network device 103, and a server 104, where an interface between the access network device 102 and the core network device 103 is an Si interface.

In this embodiment of this application, a service packet may be transmitted between the terminal device 101 and the server 104. For a specific example, the service packet is an IP service packet. Specifically, when the terminal device 101 intends to send a service packet to the server 104, the terminal device 101 may send the service packet to the access network device 102. The service packet is transmitted to the core network device 103 through an IP backhaul (backhaul) link between the access network device 102 and a core network, and then is sent by the core network device 103 to the server 104. Likewise, when the server 104 intends to send a service packet to the terminal device 101, the server may send the service packet to the core network device 103. The service packet is transmitted to the access network device 102 through an IP backhaul link between the access network device 102 and the core network, and then is sent by the access network device 102 to the terminal device 101. It should be noted that an example in which the link between the access network device and the core network is an IP backhaul is used for description herein, and the embodiments of this application are not limited thereto.

A GTPU tunnel may be established between the access network device 102 and the core network device 103 to transmit an IP service packet. In this case, the access network device 102 and/or the core network device 103 encapsulate/encapsulates a packet header into the IP service packet based on the GTPU tunnel protocol, so that an original IP packet is enabled to be transmitted on the GTPU tunnel, and an IP packet encapsulated based on the GTPU tunnel is enabled to be transmitted on the IP backhaul link.

Figure 2:
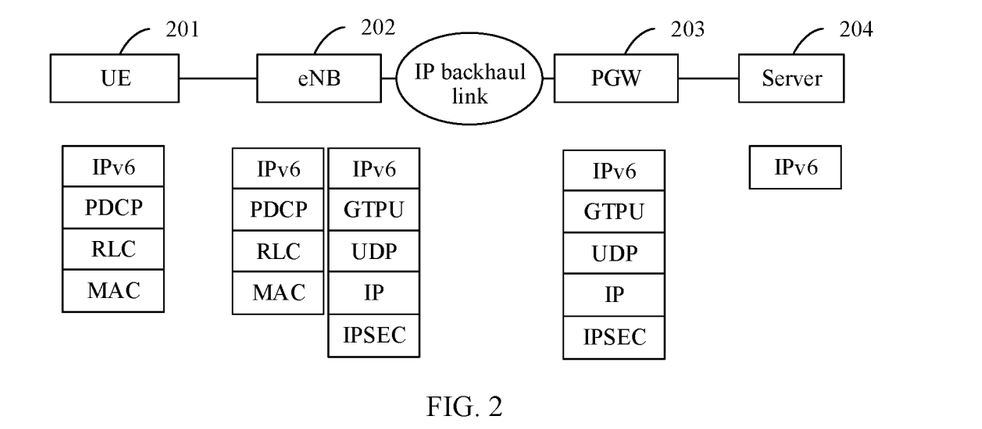
FIG. 2 is a schematic diagram of a specific system architecture to which an embodiment of this application is applied.

FIG. 2 is a schematic diagram of a specific system architecture to which an embodiment of this application is applied. Specifically, the terminal device 101 in FIG. 1 may be specifically UE 201, the access network device 102 may be specifically an eNB 202, the core network device 103 may be specifically a PDN gateway (PDN gateway, PGW) 203, and the server 104 and the server 204 may be a same device. This is not specifically limited in this embodiment of this application.

It should be noted that FIG. 1 and FIG. 2 are merely examples, and do not constitute any limitation on the embodiments of this application. For example, in this embodiment of this application, the core network device 103 may alternatively be a serving gateway (serving gateway, SGW) or another network device, for example, a network device in 5G. This is not limited in this embodiment of this application.

In this embodiment of this application, a GTPU tunnel may be established between the eNB 202 and the PGW 203 to transmit an IP packet. In this case, the eNB 202 and/or the PGW 203 encapsulate/encapsulates a GTPU/UDP/IP packet header into the IP service packet, so that the original IP packet is enabled to be transmitted on the GTPU tunnel, and an IP packet encapsulated based on the GTPU tunnel is enabled to be transmitted on an IP backhaul link. The following uses an IPv6 scenario as an example to describe a process of transmitting a packet between the UE 201, the eNB 202, the PGW 203, and the server 204.

Specifically, when the UE 201 intends to send a service packet (for example, an IPv6 packet) to the server 204, the UE 201 encapsulates a PDCP/RLC/MAC header into the service packet.

After receiving the packet, the eNB 202 decapsulates the packet to obtain the service packet.

Then, to enable the service packet to be transmitted through the GTPU tunnel, the eNB 202 encapsulates an additional GTPU/UDP/IP header into the service packet. In addition, in an IPSEC scenario, overheads of an IPSEC header further need to be added, that is, an additional IPSEC header needs to be encapsulated into the service packet.

Then, the service packet encapsulated with the GTPU/UDP/IP header is transmitted through the GTPU tunnel. After receiving the service packet in which the GTPU/UDP/IP header is encapsulated, the PGW 203 decapsulates the packet (that is, removes the GTPU/UDP/IP header) to obtain the service packet in the packet, and then sends the service packet to the server 204.

Likewise, when the server 204 intends to send a service packet (for example, an IPv6 packet) to the UE 201, the server 204 first sends the service packet to the PGW 230. Then, the PGW 203 encapsulates an additional GTPU/UDP/IP header into the service packet, so that the service packet can be transmitted to the eNB 202 through a GTPU tunnel. In addition, in an IPSEC scenario, an additional IPSEC header needs to be encapsulated into the service packet. Then, a service packet encapsulated with the GTPU/UDP/IP header is sent to the eNB 202 through the GTPU tunnel. The eNB 202 decapsulates the packet (that is, removes the GTPU/UDP/IP header) to obtain the service packet. Then, the eNB encapsulates the PDCP/RLC/MAC header into the service packet, and sends, to the UE 201, the service packet into which the PDCP/RLC/MAC header is encapsulated.

It should be noted that an IP link has a maximum transmission unit MTU, that is, the maximum length of a single packet that can be transmitted on the IP link. When the length of a single packet (for example, a packet encapsulated based on the GTPU tunnel protocol) exceeds the MTU, the packet needs to be fragmented, and then the packet that has been fragmented (that is, a fragmented packet) is transmitted. After a transmit end (for example, the eNB 202 or the PGW 203) of the IP link fragments a packet, the received fragmented packet is reassembled at a receive end (for example, a receive end of the transmit end eNB 202 is the PGW 203, and a receive end of the transmit end PGW 203 is the eNB 202) of the IP link. However, packet fragmentation and reassembly may consume a lot of computing and memory resources, thereby reducing transmission efficiency.

Figure 3:
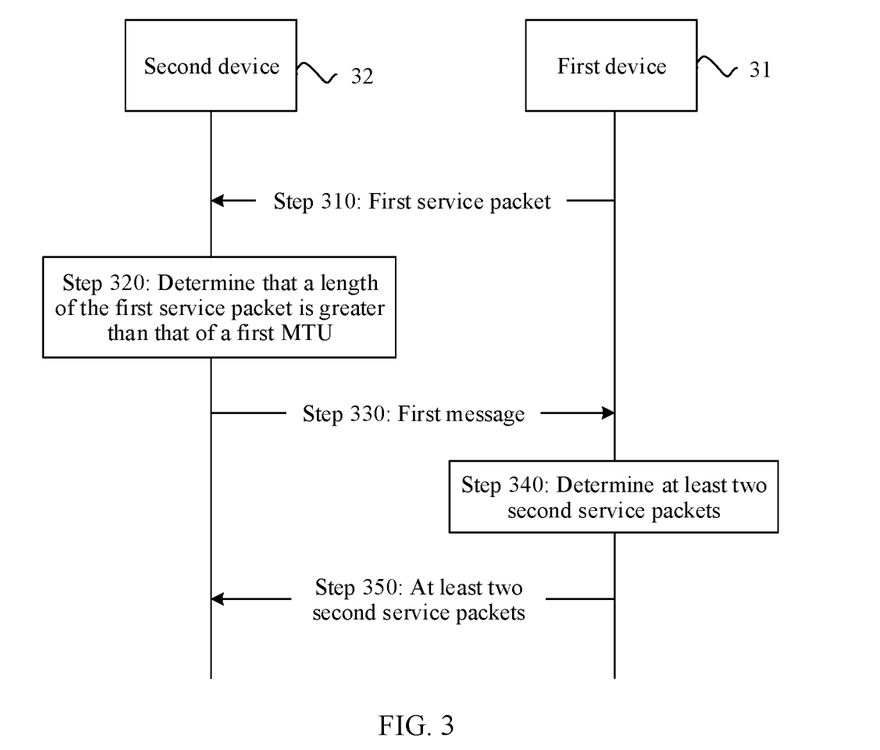
FIG. 3 is a schematic flowchart of a method for avoiding packet fragmentation according to an embodiment of this application.

FIG. 3 is a schematic flowchart of a method for avoiding packet fragmentation based on a GTPU tunnel according to an embodiment of this application. A first device 31 needs to send a service packet to a fourth device through a GPTU tunnel between a second device 32 and a third device. Specifically, the service packet is an IP service packet. In this case, the second device 32 may be referred to as a transmit end of the GTPU tunnel, and the third device may be referred to as a receive end of the GTPU tunnel. It should be understood that a manner of processing a packet by the third device and the fourth device is not limited in this embodiment of this application. Therefore, the third device and the fourth device are not shown in FIG. 3.

For example, in the system architecture shown in FIG. 2, when the UE 201 intends to send a service packet to the server 204 through the GTPU tunnel between the eNB 202 and the PGW 203, the first device 31 is the UE 201, the second device 32 is the eNB 202, the third device is the PGW 203, and the fourth device is the server 204. For another example, when the server 204 intends to send a service packet to the UE 201 through the GTPU tunnel between the PGW 203 and the eNB 202, the first device 31 is the server 204, the second device 32 is the PGW 203, the third device is the eNB 202, and the fourth device is the UE 201.

Step 310: The first device 31 sends a first service packet to the second device 32.

Correspondingly, the second device 32 receives the first service packet sent by the first device 31.

Herein, a length of the first service packet is not limited. For example, the length of the first service packet may be configured by the first device 31 based on an actual situation.

For example, the first service packet may be the service packet sent by the UE 201 to the eNB 202 as described in FIG. 2, or the service packet sent by the server 204 to the PGW 203. This is not limited in this embodiment of this application.

Step 320: The second device 32 determines whether the length of the first service packet is greater than that of the first MTU.

In this embodiment of this application, the first device (namely, the transmit end of the GTPU tunnel) may maintain the first MTU based on the GTPU tunnel, and the first MTU may be determined based on a second MTU of an IP link and a packet header encapsulated by the second device based on the GTPU tunnel. Herein, the encapsulated packet header is used to enable an original IP packet to be transmitted on the GTPU tunnel, and an IP packet encapsulated based on the GTPU tunnel is transmitted on an IP backhaul link, that is, when a length of the packet encapsulated based on the GTPU tunnel is less than or equal to that of the second MTU of the IP backhaul link, the original IP packet may be enabled to be transmitted on the GTPU tunnel, and the IP packet encapsulated based on the GTPU tunnel may be enabled to be transmitted on the IP backhaul link. For a specific example, the encapsulated packet header herein may be the foregoing GTPU/UDP/IP header.

In this embodiment of this application, the first device may configure the first MTU based on an actual requirement.

In an optional embodiment, a sum of the length of the first MTU and the length of the packet header encapsulated based on the GTPU tunnel should be less than or equal to that of the second MTU of the IP link. In other words, the length of the first MTU should be less than or equal to a difference between the length of the second MTU and the length of the GTPU header, that is:

$$MTU1 \leq MTU2 - L1, \text{ where}$$

MTU1 indicates the length of the first MTU, MTU2 indicates the length of the second MTU, and L1 indicates the length of the packet header encapsulated based on the GTPU tunnel.

For example, when the length of a GTPU/UDP/IP header is 36 (8+8+20) bytes, and the length of the second MTU of the IP link is 1500 bytes, the length of the first MTU is less than or equal to 1500−36=1464 bytes.

In another optional embodiment, in an IPSEC scenario, the length of the first MTU is less than or equal to the length of the second MTU minus the sum of the length of the packet header encapsulated by the second device based on the GTPU tunnel and a length of an IPSEC header, that is:

$MTU1 \leq MTU2-(L1-L2)$; or $MTU1 \leq MTU2-L1-L2$, where

L2 indicates a length of an IP security (IP security, IPSEC) packet header. In a specific implementation, in IPv4, because lengths of pads added to packets of different lengths are different, overheads of the IPSEC header vary from 50 to 57 bytes.

For example, when a length of a GTPU/UDP/IP header is 36 (8+8+20) bytes, the length of the second MTU of the IP link is 1500 bytes, and the length of the IPSEC header is 50 bytes, the length of the first MTU is less than or equal to 1500−36−50=1416.

In an optional embodiment, the second MTU of the GTPU tunnel is a smallest MTU in a network path of the GTPU tunnel, that is, a path MTU (path MTU, PMTU).

In addition, in a scenario in which the PMTU is not supported, the second MTU is an MTU of a transmit end device of the GTPU tunnel or an MTU of a node in the GTPU tunnel. This is not limited in this embodiment of this application.

It should be noted that the IP header and the IPSEC header in the GTPU header have overheads of different lengths in an IPv6 scenario and an IPv4 scenario. For example, in the IPv6 scenario, a basic length of the IP header is 40 bytes; and in the IPv4 scenario, the basic length of the IP header is 20 bytes.

When it is determined in step 320 that the length of the first service packet is less than or equal to that of the first MTU, the second device 32 encapsulates the first service packet based on the GTPU tunnel protocol, and sends the encapsulated first service packet to the third device through the GTPU tunnel between the second device 32 and the third device. As the length of the first service packet is less than or equal to that of the first MTU, a total length of the packet encapsulated based on the GTPU tunnel protocol is less than or equal to that of an MTU of the IP link. Therefore, the second device may be prevented from fragmenting the first service packet. Specifically, refer to the description in FIG. 2 for the process. To avoid repetition, details are not described herein again.

When it is determined in step 320 that the length of the first service packet is greater than that of the first MTU, step 330 is performed.

Step 330: The second device 32 sends a first message to the first device 31, where the first message includes the first MTU.

Correspondingly, the first device 31 receives the first message sent by the second device 32.

Specifically, the first message may be an ICMP message. For example, the first message may be referred to as a Packet Too Big message. This is not limited in this embodiment of this application.

Step 340: The first device 31 divides the first service packet into at least two second service packets based on the first MTU. A length of each of the at least two second service packets is less than or equal to that of the first MTU.

For example, when the length of the first MTU is 1400 bytes, the length of each of the at least two second service packets should be less than or equal to 1400 bytes. For example, when the length of the first service packet is 2900 bytes, and the length of the first MTU is 1400 bytes, three second service packets may be obtained, where lengths of two second service packets may be 1400 bytes, and a length of the other second service packet may be 100 bytes. It should be understood that the foregoing examples are intended for a person skilled in the art to better understand the embodiments of this application, and the embodiments of this application are not limited thereto.

Step 350: The first device 31 sends the at least two second service packets to the second device 32.

Correspondingly, the second device 32 receives the at least two second service packets sent by the first device 31.

Specifically, a manner in which the first device 31 sends the at least two second service packets to the second device 32 is similar to a manner in which the first device 31 sends the first service packet to the second device 32. To avoid repetition, details are not described herein again.

When obtaining the at least two second service packets, the second device 32 separately encapsulates the at least two second service packets based on the GTPU tunnel protocol, and sends the at least two encapsulated second service packets to a third device through a GTPU tunnel between the second device 32 and the third device. Because the length of each second service packet is less than or equal to that of the first MTU, a total length of the second service packets that have been encapsulated based on the GTPU tunnel protocol is less than or equal to that of an MTU of the GTPU tunnel. Therefore, the second device may be prevented from fragmenting the first service packet.

Further, after receiving the at least two encapsulated second service packets or the encapsulated first service packet through the GTPU tunnel, the third device decapsulates each received packet, that is, removes the GTPU header of the packet, to obtain the at least two second service packets or the first service packet, and sends the at least two second service packets or the first service packet to the fourth device.

Therefore, in this embodiment of this application, when receiving the first service packet sent by the first device, the second device first determines whether a length of the first service packet is greater than that of the first MTU maintained by the second device, where the first MTU is determined based on both a second MTU of an IP link and a packet header encapsulated based on a GTPU tunnel; and when the first service packet is greater than a first MTU size, the first MTU size is sent to the first device, so that the first device divides the first service packet into at least two second service packets based on the first MTU, and the length of each of the at least two second service packets is less than or equal to that of the first MTU. Based on this, in this embodiment of this application, the second device may be prevented from fragmenting the service packet, and the third device may be prevented from reassembling the service packet, thereby improving data transmission efficiency of the GTPU tunnel.

Figure 4:
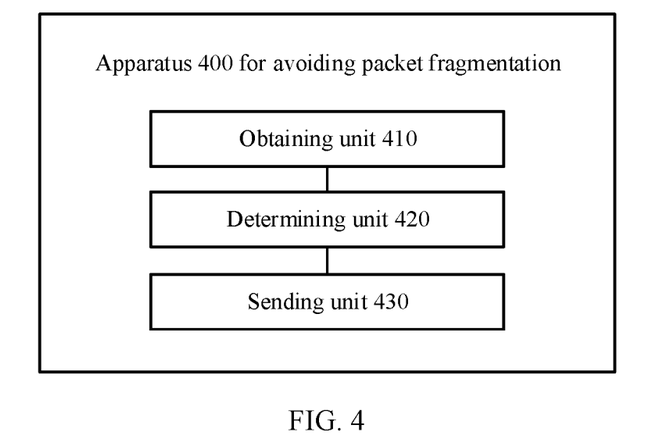
FIG. 4 is a schematic block diagram of an apparatus for avoiding packet fragmentation according to an embodiment of this application.

FIG. 4 is a schematic block diagram of an apparatus 400 for avoiding packet fragmentation based on a GTPU tunnel according to an embodiment of this application.

An obtaining unit 410 is configured to obtain a first service packet sent by a first device.

A determining unit 420 is configured to determine that a length of the first service packet is greater than a first maximum transmission unit MTU.

A sending unit 430 is configured to: when the determining unit 420 determines that the length of the first service packet is greater than that of the first maximum transmission unit MTU, send a first message to the first device, where the first message includes the first MTU.

The obtaining unit 410 is further configured to obtain at least two second service packets sent by the first device, where the at least two second service packets are determined by the first device based on the first service packet, and a length of each of the at least two second service packets is less than or equal to that of the first MTU.

Herein, an example in which the apparatus 400 is the foregoing second device is used as an example for description. When obtaining the at least two second service packets, the second device separately encapsulates the at least two second service packets based on the GTPU tunnel protocol, and sends the at least two encapsulated second service packets to a third device through a GTPU tunnel between the second device and the third device. Because the length of each second service packet is less than or equal to that of the first MTU, a total length of the second service packets that have been encapsulated based on the GTPU tunnel protocol is less than or equal to that of an MTU of the GTPU tunnel. Therefore, the second device may be prevented from fragmenting the first service packet.

Therefore, in this embodiment of this application, when receiving the first service packet sent by the first device, the second device first determines whether the length of the first service packet is greater than that of the first MTU maintained by the second device, where the first MTU is determined based on both a second MTU of an IP link and a packet header encapsulated based on a GTPU tunnel; and when the first service packet is greater than a first MTU size, the first MTU size is sent to the first device, so that the first device divides the first service packet into at least two second service packets based on the first MTU, and the length of each of the at least two second service packets is less than or equal to that of the first MTU. Based on this, in this embodiment of this application, the second device may be prevented from fragmenting the service packet, and the third device may be prevented from reassembling the service packet, thereby improving data transmission efficiency of the GTPU tunnel.

Optionally, the first MTU meets the following formula:

MTU1≤MTU2−L1, where

MTU1 indicates the length of the first MTU, MTU2 indicates a length of a second MTU of an IP link, and L1 indicates a length of a packet header encapsulated by the apparatus 400 based on the GTPU tunnel.

Optionally, the first MTU meets the following formula:

MTU1≤MTU2−L1−L2, where

MTU1 indicates the length of the first MTU, MTU2 indicates a length of the second MTU of an IP link, L1 indicates a length of a packet header encapsulated by the apparatus based on the GTPU tunnel, and L2 indicates a length of an IPSEC header.

Optionally, the packet header encapsulated by the apparatus 400 based on the GTPU tunnel is a GTPU/UDP/IP header.

Optionally, the second MTU is a smallest MTU in a network path of the IP link.

Figure 5:
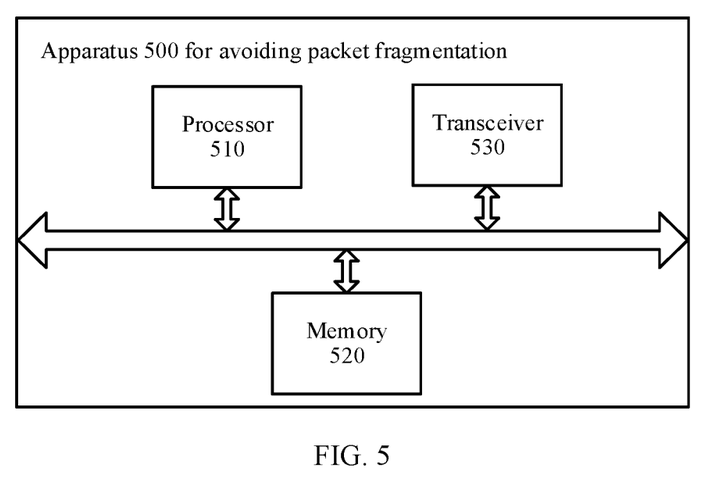
FIG. 5 is a schematic block diagram of another apparatus for avoiding packet fragmentation according to an embodiment of this application.

It should be noted that in this embodiment of this application, the determining unit 420 may be implemented as a processor, and the receiving unit 410 and the sending unit 430 may be implemented as a transceiver. As shown in FIG. 5, an apparatus 500 for avoiding packet fragmentation may include a processor 510, a memory 520, and a transceiver 530. The memory 520 may be configured to store, for example, code executed by the processor 510. The processor 510 may be configured to process data or a program.

In an implementation process, steps in the foregoing methods can be implemented by using a hardware integrated logical circuit in the processor 510, or by using instructions in a form of software. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 520, and a processor 510 reads information in the memory 520 and completes the steps in the foregoing methods in combination with hardware of the processor. To avoid repetition, details are not described herein again.

The apparatus 400 shown in FIG. 4 or the apparatus 500 shown in FIG. 5 can implement processes performed by the second device corresponding to the foregoing method embodiments. Specifically, for the apparatus 400 or the apparatus 500, refer to the foregoing descriptions. To avoid repetition, details are not described herein again.

Figure 6:
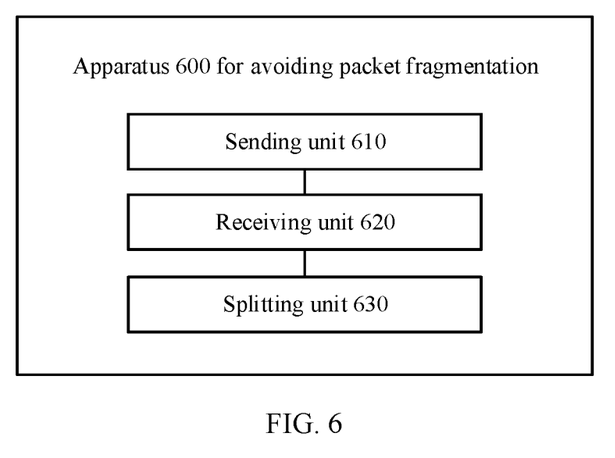
FIG. 6 is a schematic block diagram of another apparatus for avoiding packet fragmentation according to an embodiment of this application.

FIG. 6 is a schematic block diagram of an apparatus 600 for avoiding packet fragmentation according to an embodiment of this application.

A sending unit 610 is configured to send a first service packet to a second device.

The receiving unit 620 is configured to receive a first message sent by the second device, where the first message includes a first MTU, and a length of the first service packet is greater than that of the first MTU.

The splitting unit 630 is configured to divide the first service packet into at least two second service packets based on the first MTU, where a length of each of the at least two second service packets is less than or equal to that of the first MTU.

The sending unit 610 is further configured to send the at least one second service packet to the second device.

Herein, an example in which the apparatus 600 is the foregoing first device is used as an example for description. When obtaining the at least two second service packets, the second device separately encapsulates the at least two second service packets based on the GTPU tunnel protocol, and sends the at least two encapsulated second service packets to a third device through a GTPU tunnel between the second device and the third device. Because the length of each second service packet is less than or equal to that of the first MTU, a total length of the second service packets that have been encapsulated based on the GTPU tunnel protocol is less than or equal to that of an MTU of the GTPU tunnel. Therefore, the second device may be prevented from fragmenting the first service packet.

Therefore, in this embodiment of this application, when receiving the first service packet sent by the first device, the second device first determines whether the length of the first service packet is greater than that of the first MTU maintained by the second device, where the first MTU is determined based on both a second MTU of an IP link and a packet header encapsulated based on a GTPU tunnel; and when the first service packet is greater than the first MTU size, the first MTU size is sent to the first device, so that the first device divides the first service packet into at least two second service packets based on the first MTU, and the length of each of the at least two second service packets is less than or equal to that of the first MTU. Based on this, in this embodiment of this application, the second device may be prevented from fragmenting the service packet, and the third device may be prevented from reassembling the service packet, thereby improving data transmission efficiency of the GTPU tunnel.

Optionally, the first MTU meets the following formula:

$$MTU1 \leq MTU2-L1, \text{ where}$$

MTU1 indicates the length of the first MTU, MTU2 indicates a length of a second MTU of an IP link, and L1 indicates a length of a packet header encapsulated by the second device based on the GTPU tunnel.

Optionally, the first MTU meets the following formula:

$$MTU1 \leq MTU2-L1-L2, \text{ where}$$

MTU1 indicates the length of the first MTU, MTU2 indicates a length of the second MTU of the IP link, L1 indicates a length of the packet header encapsulated by the second device based on the GTPU tunnel, and L2 indicates a length of an IPSEC header.

Optionally, the packet header encapsulated by the second device based on the GTPU tunnel is a GTPU/UDP/IP header.

Optionally, the second MTU is a smallest MTU in a network path of the IP link.

Figure 7:
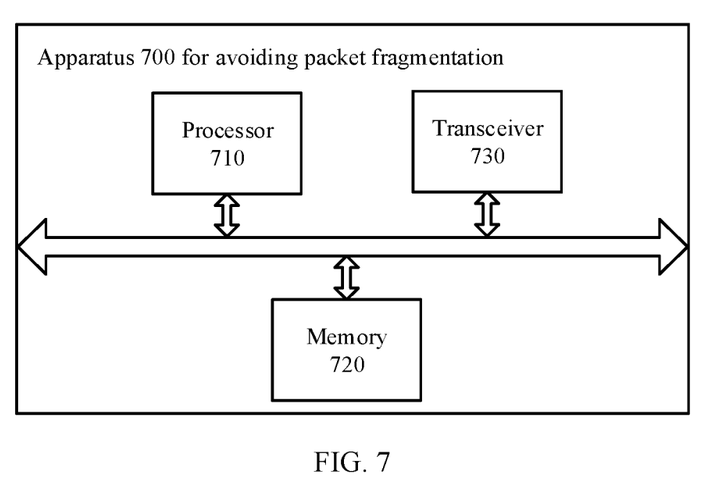
FIG. 7 is a schematic block diagram of another apparatus for avoiding packet fragmentation according to an embodiment of this application.

It should be noted that, in this embodiment of this application, the sending unit 610 and the receiving unit 620 may be transceivers, and the splitting unit 630 may be a processor. As shown in FIG. 7, an apparatus 700 for avoiding packet fragmentation may include a processor 710, a memory 720, and a transceiver 730. The memory 720 may be configured to store, for example, code executed by the processor 710. The processor 710 may be configured to process data or a program.

In an implementation process, steps in the foregoing methods can be implemented by using a hardware integrated logical circuit in the processor 710, or by using instructions in a form of software. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 720, and a processor 710 reads information in the memory 720 and completes the steps in the foregoing methods in combination with hardware of the processor. To avoid repetition, details are not described herein again.

The apparatus 600 shown in FIG. 6 or the apparatus 700 shown in FIG. 7 can implement processes performed by the first device in the foregoing method embodiments. Specifically, for the apparatus 600 or the apparatus 700, refer to the foregoing descriptions. To avoid repetition, details are not described herein again.

An embodiment of this application further provides a computer-readable medium, configured to store a computer program. The computer program includes instructions used to perform the method corresponding to the foregoing method embodiments.

An embodiment of this application further provides a computer program product. The computer program product includes computer program code. When the computer program code is run by a processor of an apparatus for avoiding packet fragmentation, the apparatus for avoiding packet fragmentation is enabled to perform a corresponding method in any one of the foregoing method embodiments.

The embodiments in this application may be separately or jointly used. This is not limited herein.

It should be understood that descriptions such as "first" and "second" in the embodiments of this application are merely used to illustrate and distinguish between described objects, and do not indicate a sequence or a special limitation on a quantity of devices in the embodiments of this application, and do not constitute any limitation on the embodiments of this application.

It should be further understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for avoiding packet fragmentation based on a GPRS tunneling protocol for the user plane (GTPU) tunnel, comprising:
   obtaining, by a second device, a first service packet sent by a first device;
   upon determining that a length of the first service packet is greater than that of a first maximum transmission unit (MTU), sending, by the second device, a first message to the first device, wherein the first message comprises the first MTU, and the first MTU is determined based on a second MTU of an IP link and a packet header encapsulated by the second device based on the GTPU tunnel; and
   obtaining, by the second device, at least two second service packets sent by the first device, wherein the at least two second service packets are determined by the first device based on the first service packet, and a length of each of the at least two second service packets is less than or equal to that of the first MTU.

2. The method according to claim 1, wherein the first MTU meets the following formula:
   MTU1≤MTU2 L1, wherein
   MTU1 indicates the length of the first MTU, MTU2 indicates a length of second MTU of the IP link, and L1 indicates a length of the packet header encapsulated by the second device based on the GTPU tunnel.

3. The method according to claim 2, wherein the packet header encapsulated by the second device based on the GTPU tunnel is a GTPU/UDP/IP header.

4. The method according to claim 2, wherein the second MTU is a smallest MTU in a network path of the IP link.

5. The method according to claim 1, wherein the first MTU meets the following formula:
   MTU1≤MTU2−L1−L2, wherein
   MTU1 indicates the length of the first MTU, MTU2 indicates the length of the second MTU of the IP link, L1 indicates a length of the packet header encapsulated by the second device based on the GTPU tunnel, and L2 indicates a length of an IPSEC header.

6. The method according to claim 5, wherein the packet header encapsulated by the second device based on the GTPU tunnel is a GTPU/UDP/IP header.

7. The method according to claim 5, wherein the second MTU is a smallest MTU in a network path of the IP link.

8. The method according to claim 1, wherein the first service packet is an IPv6 packet.

9. An apparatus, comprising:
   at least one processor; and
   a memory coupled to the at least one processor, the at least one processor being configured to:
   obtain a first service packet sent by a first device;
   determine whether a length of the first service packet is greater than that of a first maximum transmission unit MTU; and
   upon determining that the length of the first service packet is greater than the first maximum transmission unit MTU, send a first message to the first device, wherein the first message comprises the first MTU, and the first MTU is determined based on a second MTU of an IP link and a packet header encapsulated by the apparatus based on a GPRS tunneling protocol for the user plane (GTPU) tunnel, wherein
   the at least one processor is further configured to: obtain at least two second service packets sent by the first device, wherein the at least two second service packets are determined by the first device based on the first service packet, and a length of each of the at least two second service packets is less than or equal to that of the first MTU.

10. The apparatus according to claim 9, wherein the first MTU meets the following formula:
    MTU1≤MTU2−L1, wherein
    MTU1 indicates the length of the first MTU, MTU2 indicates a length of second MTU of the IP link, L1 indicates a length of the packet header encapsulated by the apparatus based on the GTPU tunnel.

11. The apparatus according to claim 10, wherein the second MTU is a smallest MTU in a network path of the IP link.

12. The apparatus according to claim 9, wherein the first MTU meets the following formula:
    MTU1≤MTU2−L1−L2, wherein
    MTU1 indicates the length of the first MTU, MTU2 indicates a length of the second MTU of the IP link, L1 indicates a length of packet header encapsulated by the apparatus based on the GTPU tunnel, and L2 indicates a length of an IPSEC header.

13. The apparatus according to claim 12, wherein the packet header encapsulated by the apparatus based on the GTPU tunnel is a GTPU/UDP/IP header.

14. The apparatus according to claim 12, wherein the second MTU is a smallest MTU in a network path of the IP link.

15. The apparatus according to claim 10, wherein the packet header encapsulated by the apparatus based on the GTPU tunnel is a GTPU/UDP/IP header.

16. A non-transitory computer readable storage medium storing a program that, when executed by at least one processor, cause the at least one processor to perform operations comprising,
    obtaining, by a second device, a first service packet sent by a first device;
    upon determining that a length of the first service packet is greater than that of a first maximum transmission unit (MTU), sending, by the second device, a first message to the first device, wherein the first message comprises the first MTU, and the first MTU is determined based on a second MTU of an IP link and a packet header encapsulated by the second device based on GPRS tunneling protocol for a user plane (GTPU) tunnel; and obtaining, by the second device, at least two second service packets sent by the first device, wherein the at least two second service packets are determined by the first device based on the first service packet, and a length of each of the at least two second service packets is less than or equal to that of the first MTU.

17. The non-transitory computer readable storage medium according to claim 16, wherein the first MTU meets the following formula:

MTU1≤MTU2−L1, wherein

MTU1 indicates the length of the first MTU, MTU2 indicates a length of the second MTU of the IP link, and L1 indicates a length of the packet header encapsulated by the second device based on the GTPU tunnel.

18. The non-transitory computer readable storage medium according to claim 17, wherein the packet header encapsulated by the second device based on the GTPU tunnel is a GTPU/UDP/IP header.

19. The non-transitory computer readable storage medium according to claim 17, wherein the second MTU is a smallest MTU in a network path of the IP link.

20. The non-transitory computer readable storage medium according to claim 16, wherein the first MTU meets the following formula:

MTU1≤MTU2−L1−L2, wherein

MTU1 indicates the length of the first MTU, MTU2 indicates a length of second MTU of the IP link, L1 indicates a length of the packet header encapsulated by the second device based on the GTPU tunnel, and L2 indicates a length of an IPSEC header.

21. The non-transitory computer readable storage medium according to claim 20, wherein the packet header encapsulated by the second device based on the GTPU tunnel is a GTPU/UDP/IP header.

* * * * *

UNITED STATES PATENT AND TRADEMARK OFFICE
CERTIFICATE OF CORRECTION

PATENT NO. : 11,394,656 B2
APPLICATION NO. : 17/134077
DATED : July 19, 2022
INVENTOR(S) : Chengxu Guo Page 1 of 1

It is certified that error appears in the above-identified patent and that said Letters Patent is hereby corrected as shown below:

In the Specification

• Column 6, Line 25, replace "Si" with "S1";

In the Claims

• Claim 2, at Column 15, Line 54, replace "indicates a length of second" with "indicates a length of the second";

• Claim 10, at Column 16, Line 37, replace "indicates a length of second" with "indicates a length of the second";

• Claim 12, at Column 16, Line 48, replace "indicates a length of packet" with "indicates a length of the packet"; and

• Claim 20, at Column 18, Line 13, replace "indicates a length of second" with "indicates a length of the second".

Signed and Sealed this
Sixteenth Day of August, 2022

Katherine Kelly Vidal
*Director of the United States Patent and Trademark Office*